Dec. 8, 1942.                C. L. THOMAS                2,304,128
               FLUID CATALYST PROCESS AND APPARATUS
                      Filed Sept. 29, 1941
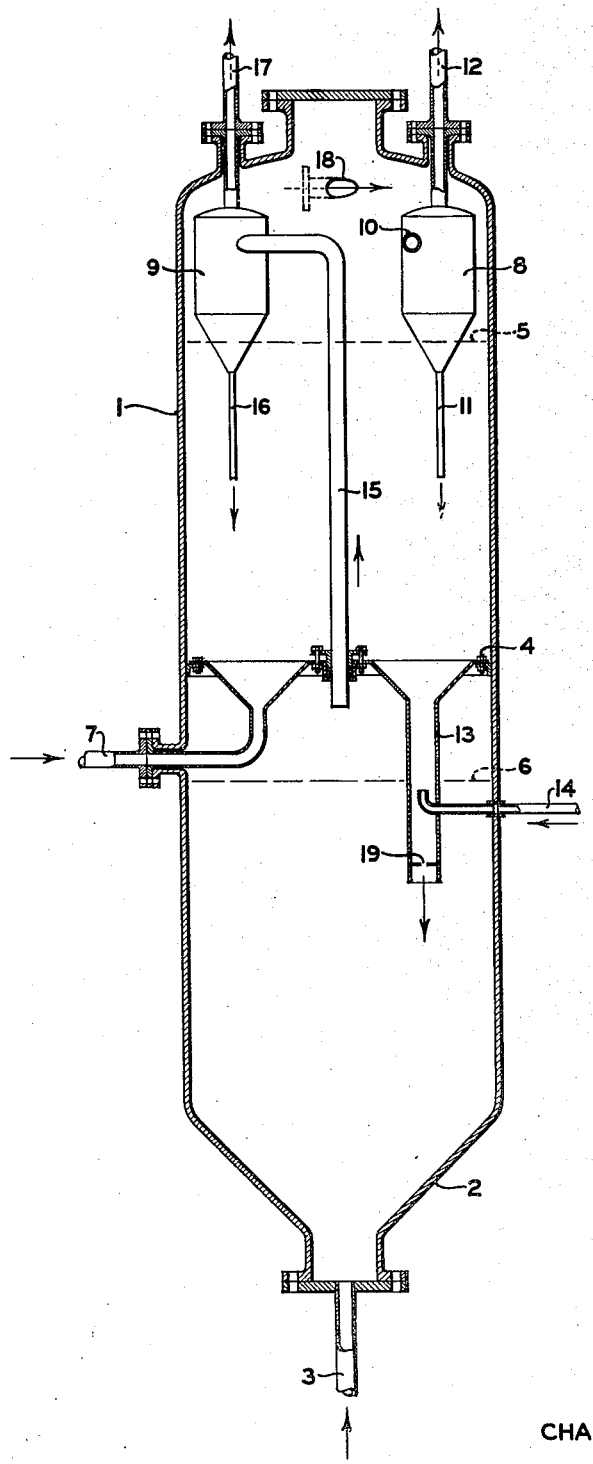
INVENTOR
CHARLES L. THOMAS
BY
ATTORNEY Patented Dec. 8, 1942

2,304,128

UNITED STATES PATENT OFFICE 2,304,128

FLUID CATALYST PROCESS AND APPARATUS

Charles L. Thomas, Chicago, Ill., assignor to Universal Oil Products Company, Chicago, Ill., a corporation of Delaware Application September 29, 1941, Serial No. 412,758

7 Claims. (Cl. 196—52)

This invention relates to a process for the conversion of hydrocarbons in the presence of a powdered catalyst, said catalyst thereby becoming contaminated with combustible material and thereafter being regenerated by the oxidation of said combustible material by air or other oxygen containing medium such as air diluted with products of combustion.

My invention covers broadly a process and apparatus for contacting a powdered solid successively with two gases in separate contacting zones. It is applicable to such hydrocarbon conversions as catalytic cracking, catalytic reforming, catalytic dehydrogenation and catalytic desulfurization and the like.

The common method of operation heretofore employed in these processes consists of disposing the catalyst in the form of granules or pellets as a fixed bed in a reactor, the charging stock being passed through said fixed bed until the catalyst is no longer effective in promoting the desired reaction. The flow of the reactants was then interrupted and an inert gas such as steam or oxygen free products of combustion passed through the bed of catalyst to purge it free from the hydrocarbon reactants. After the purging, a mixture of air and products of combustion, preheated to a temperature approximately 800-900° F. was passed through the bed of carbonized catalyst to oxidize the carbonaceous material thereby regenerating said catalyst. Such method of operation has the inherent disadvantage in that it is intermittent in character requiring a complicated system of switch valves and associated timing mechanism. The intermittent process also has a disadvantage in that the activity of the catalyst varies considerably during the processing period having a very high initial activity and a low final activity. This variation in catalyst activity results in an overcracking or more generally overprocessing during the initial portion of the conversion period and an undercracking or more generally an insufficient degree of conversion during the final portion of the processing period. It is evident that such a method of operation produces a stream of reactants of variable composition thus affecting adversely the fractionating and other separating equipment following the conversion step.

In the process of my invention the degree of conversion can be maintained at the constant level desired as the catalyst has a degree of activity which remains substantially the same throughout the process. The complicated timing mechanisms and switching arrangements inherent in fixed bed operations are eliminated in my process. In my process the fixed catalyst bed is replaced by a mass of powder through which the reactants or the regenerating medium as the case may be is bubbled. This bubbling movement of the gases serves to thoroughly agitate the mass of powder keeping it mixed so that the activity and percentage of carbon are approximately uniform throughout its mass. The density of the powder in terms of pounds per cubic foot is perhaps somewhat less than the weight per cubic foot of catalyst in a fixed bed. In some experiments in catalytic cracking employing an activated clay the amount of powder present per cubic foot of the dense phase of catalyst varied from about 5 to about 20 pounds. The gases or vapors disengaging from the upper surface of the dense mass of powder carry in suspension small quantities of said powder and in the process of my invention centrifugal separating means are used to recover this entrained material.

Other methods of separating solid from gas are comprised within the scope of my invention as for example the Cottrell electrical precipitator which could be used although it is usually more economical to accomplish the separation by such means as cyclone separators. In some cases a combination of centrifugal and electrical means is used, the cyclone separators being followed by the Cottrell precipitator which removes the last traces of suspended material. The hydrocarbon reaction products or the gaseous products of regeneration as the case may be are removed from their respective zones of contact at a point somewhat above the level of the dense phase of catalyst powder hereinbefore referred to. These gases with their suspended material after passing through separating equipment are removed from the reactor and subjected to further steps to recover their heat content in the case of the gaseous products of regeneration and to fractionation steps to recover the various hydrocarbon fraction in case of the reaction products. The powder separated from the cyclone separators is returned to the dense phase of the upper contacting zone, this dense phase providing what might be called a "liquid seal" for the separators. The upper and lower contacting zones are connected by a conduit arranged in such a manner that the catalyst flows from the dense phase of the upper contacting zone to the dense phase of the lower contacting zone.

It is thus apparent that the circuit for the powder is completed and it is necessary only to add a quantity of catalyst to the system which is equal in amount to that which the separators failed to remove from the effluent gases. This replacement of catalyst is in many cases sufficient to keep the catalyst activity at the level desired. This small quantity of make-up catalyst can be supplied either with the stream of hydrocarbon reactants or may be added directly to the reactor by separate means as hereinafter set forth.

The process of my invention will be more clearly understood by reference to the accompanying drawing which diagrammatically shows a vertical section of my apparatus, for conducting the process of my invention.

As shown in the accompanying drawing my apparatus consists of a vertical cylindrical shell indicated by the numeral 1. This shell is preferably insulated with refractory material in order to prevent heat loss. This feature has, for the sake of simplicity, been omitted from the drawing. The shell is provided with a conical bottom 2 and an inlet nozzle 3 into which either the hydrocarbon reactants or the gaseous regenerating medium may be supplied. The reactor itself comprises two contacting zones located in the upper and lower region of the shell respectively, said contacting zones being separated by a partition 4. The upper and lower compartments are filled with catalyst powder to a level which is represented by numerals 5 and 6 respectively.

Although the position of the processing and reactivating zones may be reversed, the operation of my process will be discussed for the case wherein the lower region is used as a reactivating zone while the upper region is a processing zone. The hydrocarbon reactants are in such a case supplied to the system by means of nozzle 7 from which they are directed to the upper contacting zone, bubbling through the catalyst powder, the upper level of the dense phase of which is indicated by numeral 5. The upper compartment contains two cyclone separators indicated by numerals 8 and 9, the purpose of which is to separate the entrained catalyst or powder from the effluent gases. The temperatures and pressures within the hydrocarbon converion zone vary with the particular reactions taking place. In the catalytic cracking of high boiling hydrocarbons to form lower boiling products including gasoline the temperature may vary from about 800 to about 1000° F. although such temperatures are not regarded as the limits within which the cracking process may operate as the temperature used decides in part the nature of the products obtained. While the catalytic cracking process may commonly operate at temperatures somewhat above 900° F. the catalytic reforming process when using a dehydrogenating and dehydrocyclocizing catalyst employs a somewhat higher temperature with perhaps 1100° F. as the upper limit with temperatures from 950 to 1000° F. being commonly used. The pressures employed within the hydrocarbon conversion zone are also dependent upon the particular process, the catalytic cracking operation being conducted at a midly superatmospheric pressure while the catalytic reforming process employs a somewhat higher pressure, particularly when hydrogen is commingled with the charging stock for the purpose of reducing the amount of carbon formed on the catalyst. The time that the catalyst remains in contact with the charging stock also varies considerably with the process and with the charging stock. In the catalytic cracking of hydrocarbons at temperatures moderately above 900° F., the charge may remain in the reacting zone for a period of time varying from around 5 to 20 seconds. The catalyst remains within the processing zone for a somewhat greater period of time before it is so contaminated with carbonaceous deposits as to require regeneration. In some experimental work on catalytic cracking the catalysts remained within the processing zone for a period of time varying from 250 to 300 seconds. The hydrocarbon reactants bubble through the dense phase of catalyst powder, the latter having a density which may be around 20 pounds per cubic foot. The hydrocarbon reaction products enter cyclone separator 8 through opening 10.

The quantity of suspended powder in the gases in the upper region of the hydrocarbon reaction zone is comparatively small. While the quantity of catalyts in the dense region may be around 5 or 20 pounds per cubic foot, the gases in the space above the level indicated by the numeral 5 may contain considerably less than one pound per cubic foot. In some cases less than 0.01 pound of catalyst is present in each cubic foot of gas entering separator 8. Although only a single cyclone separator has been shown in the drawing for separating the catalyst powder from the hydrocarbon reaction products, the use of a plurality of cyclone separators is comprised within the scope of my invention. The powder separated from the reaction products leaves cyclone separator 8 by way of line 11. In the operation of this separator, line 11 is filled with catalyst thus forming a seal between the gases leaving the separator and the dense phase of the catalyst in the upper contacting zone. The powder free hydrocarbon reaction products leave cyclone separator 8 by way of line 12 from which they are directed to the fractionation system for the recovery of gasoline, higher boiling hydrocarbons and normally gaseous products. Insufficiently converted hydrocarbons boiling above the range of gasoline may be returned to the system by way of line 7 for further treatment. The carbonized catalyst flows through the dense phase of the upper contacting zone to the dense phase of the lower contacting zone through conduit 13. The flow of the catalyst through conduit 13 is regulated by orifice 19. In order to remove any volatile hydrocarbons which may be absorbed on the partially spent catalyst, an inert gas such as steam is directed by way of line 14 into conduit 13 thus serving to strip the volatile constituents absorbed on said catalyst powder.

The carbonized catalyst in the lower contacting zone is regenerated by oxygen containing gases such as air or air diluted with inert gases such as combustion gases. As the catalyst used in hydrocarbon co.iversions loses its activity when subjected to temperatures above a certain maximum, the temperatures in the regeneration zone must be carefully controlled. When activated clays are used in the cracking of higher boiling hydrocarbons, the upper temperature limit is usually not permitted to be in excess of 1100° F. With the synthetic silica-alumina type catalyst somewhat higher temperatures are permissible but it is usually found not desirable to allow the temperature of regeneration to exceed 1300° F. The alumina-chromia or alumina-molybdena type catalyst used in the reforming process are rather refractory at the higher temperatures but it is usually found advisable to use regenerating temperatures not exceeding 1300° or 1350° F. The regenerating gases enter the lower portion of the lower contacting zone by means of conduit 3 and bubble through the catalyst powder contained therein. The flow of the gases serves to keep the powder in a constant state of agitation. The superficial velocity of the regenerating gases is subject to considerable variation depending upon the dimensions of the equipment, the percentage of oxygen in the gas as well as the ratio of the oxygen to the catalyst contained in the regenerating zone. The gaseous products of regeneration are separated rather sharply from the dense phase of the catalyst powder, the upper level which is indicated by numeral 6 in the drawing. The mixture of said gaseous products of regeneration together with the small quantity of suspended catalyst leaves the lower zone by way of conduit 15 from which it enters cyclone separator 9.

As shown in the drawing both conduit 15 and cyclone separator 9 are principally enclosed within the upper zone of the reactor. The powder separated in cyclone separator 9 is returned to the upper contacting zone by means of conduit 16. Conduit 16 is filled with the dense phase of the catalyst powder thus forming an effective seal between the regenerated catalyst and the gaseous products of regeneration, said gaseous products of regeneration being removed from the cyclone separator by means of conduit 17. Although the drawing shows only one cyclone separator for separating the regenerated catalyst from the products of regeneration, a plurality of separators may be employed. The number of these cyclone separators depends somewhat upon the size of the installation.

As hereinbefore set forth the reactor of my invention is readily adapted to a reversal of the function of the two contacting zones. The lower zone may be used for the conversion of hydrocarbons in which case the reactants would be admitted through conduit 3 from which they would bubble through the relatively dense phase of catalyst powder, the mixture of the reaction products together with a certain quantity of entrained catalyst then entering conduit 15 from which they would be directed to cyclone separator 9. The carbonized catalyst separated from the hydrocarbon reaction products in said separator would then be directed to the regeneration zone by means of conduit 16. Although not shown in the drawing the carbonized catalyst in conduit 16 is preferably subjected to a steam stripping as in the method of operation hereinbefore described. Steam or other inert gases used for this purpose could be readily admitted by means of a jet to leg 16 which returns the carbonized powder to the reactivating zone. The air or mixture of air and inert gases used for regenerating the carbonized catalyst would in this method of operation be admitted through conduit 7 from which it would flow through the dense phase in the upper contacting zone, oxidizing the carbonaceous material deposited on the catalyst. The mixture of gaseous products of regeneration together with a certain amount of entrained catalyst would then enter cyclone separator 8 through conduit 10 wherein the entrained solid would be removed from the products of regeneration, the gaseous products of regeneration substantially free from entrained solid would then be withdrawn through conduit 12. The regenerated catalyst separated from the products of regeneration then flows through conduit 11 into the dense phase of the catalyst power in the upper contacting zone. The regenerated catalyst flows from the dense phase of the upper contacting zone through conduit 13 into the lower and in this case processing zone. In this reverse method of operation stripping means 14 would be omitted.

If desired additional catalyst may be added to the reactor by means of opening 18. This is not necessary, however, as catalyst may be supplied in either the stream of reactants or the reactivating gas stream.

I claim as my invention:

1. A method of contacting a powdered solid successively with two gases which comprises maining two solid-gas contacting zones in a vertical, elongated, confined space, one of said zones being disposed vertically over the other and partitioned therefrom, the aforesaid two gases being admitted at the lower portion of their respective contacting zones and flowing upwardly through the powder in said zone, causing said powder in each zone to maintain a lower phase of relatively high density and an upper phase of relative low density, withdrawing the gas and suspended powder from each of said contacting zones from the upper phase of lower density in said zone, subjecting each gas and powder entrained therein to a powder-gas separating step and returning the powder thus separated to the phase of high density of the upper contacting zone, the powder flowing from the dense phase of the upper contacting zone to the dense phase of the lower contacting zone thus completing the circuit for said powder.

2. A process wherein a powdered solid catalyzes a gaseous reaction, the catalyst thereby becoming contaminated and thereafter being reactivated by a gaseous regenerating medium which comprises, maintaining two solid-gas contacting zones in a vertically elongated confined space one of said zones being disposed vertically over the other, the aforesaid gaseous reactant and gaseous regenerating medium flowing upwardly through their respective powder-gas contacting zones, the upward movement of said gases causing the powder in each zone to maintain a lower region of relatively high density and an upper region of relatively low density, withdrawing gaseous reaction products and suspended powder from the region of low density of their respective zone of contact, subjecting said gaseous reaction products and suspended powder to a powder-gas separating step, returning the powder thus separated to the region of high density of the upper contacting zone, withdrawing gaseous products of regeneration and suspended powder from the region of low density of the catalyst regeneration zone, subjecting said mixture of gaseous products of regeneration and suspended powder to a powder-gas separation step and returning the powder thus separated to the region of high density of the upper contacting zone, and flowing the powder from the dense phase of the upper contacting zone to the dense phase of the lower contacting zone thus completing the circuit for said powder.

3. A process for the catalytic conversion of hydrocarbons in the gaseous state in the presence of a powdered catalyst said catalyst thereby becoming contaminated with carbonaceous material and thereafter being reactivated by the oxidation of said carbonaceous material, by a regenerating medium containing oxygen, which comprises maintaining two powder-gas contacting zones in a vertically elongated confined space, one of said zones being disposed vertically over the other, the aforesaid hydrocarbons in gaseous state and the gaseous regenerating medium flowing upwardly through their respective catalyst contacting zones, the upward movement of said gases causing the powder in each zone to maintain a lower region of relatively high density and an upper region of relatively low density, withdrawing the hydrocarbon reaction products and suspended catalyst from the region of low density of their respective zone of contact, subjecting said reaction products and suspended powder to a catalyst separation step, returning the catalyst powder thus separated to the region of high density of the upper contacting zone, withdrawing gaseous products of regeneration and suspended catalyst from the region of low density of the catalyst regeneration zone, subjecting said mixture of gaseous products of regeneration and suspended catalyst to a catalyst separation step, returning the catalyst thus separated to the region of high density of the upper contacting zone and flowing the powder from the dense phase of the upper contacting zone to the dense phase of the lower contacting zone thus completing the circuit for said powder.

4. A process for the catalytic cracking of hydrocarbons in the gaseous state which comprises maintaining two solid-gas contacting zones in a vertically elongated confined space, one of said zones being disposed over the other, the aforesaid hydrocarbons in gaseous state and the gaseous regenerating medium flowing upwardly through their respective catalyst contacting zones, the upward movement of said gases causing the catalyst powder in each zone to maintain a lower region of relatively high density and an upper region of relatively low density, withdrawing the catalytically cracked products and suspended catalyst from the region of low density of their respective zone of contact, subjecting said catalytically cracked products and suspended catalyst to a catalyst separation step, returning the catalyst powder thus separated to the region of high density of the upper contacting zone, withdrawing gaseous products of regeneration and a suspended powder from the region of lower density of the catalyst regeneration zone, subjecting said mixture of gaseous products of regeneration and suspended powder to a powder-gas separating step and returning the powder thus separated to the region of high density of the upper zone and flowing the powder from the dense phase of the upper contacting zone to the dense phase of the lower contacting zone thus completing the circuit for said powder.

5. A reactor of the class described comprising, in combination an elongated outer shell closed at its opposite ends and provided with a partition intermediate its ends forming an upper contacting and reaction zone and a lower contacting and regenerating zone, means for admitting regenerating gases to the lower portion of said lower zone, means for admitting fluid reactants to be converted to the lower portion of said upper zone, means for admitting fresh finely divided solid contact material to said reactor, means disposed within the upper portion of said upper zone for separating entrained particles of said solid contact material from reaction products withdrawn from the upper portion of the lower zone, separate means disposed within the upper portion of the upper zone for separating entrained particles of said solid contact material from regenerating gases withdrawn from the upper portion of the upper zone, outlet connections on said separating means and on the shell for discharging reaction products and spent regenerating gases from the respective separating means and from the reactor, conduits extending from each of said separating means downward to an intermediate point in the upper zone for returning said separated particles thereto, and a conduit extending downwardly from the lower portion of the upper zone to an intermediate point in the lower zone for returning, to the latter, regenerated catalyst from above the partition.

6. A reactor of the class described comprising in combination an elongated vertical, cylindrical shell closed at its upper and lower ends and provided with a partition intermediate said ends which divides the same into an upper zone and a lower zone for contacting a powdered solid successively with each of two gases, means for admitting each gas to be contacted in the lower portion of its respective contacting zone, means for admitting a fresh, finely divided solid contact material to said reactor, means disposed with the upper portion of said upper zone for separating entrained particles of said solid contact material from the gas withdrawn from the upper portion of the lower zone, separate means disposed with the upper portion of the upper zone for separating entrained particles of said solid contact material from gases withdrawn from the upper portion of the upper zone, outlet connections on said separating means and on the shell for discharging gases substantially free from entrained solid from the respective separating means and from the reactor, conduits extending from each of said separating means downwardly to an intermediate point in the upper zone for returning said separated particles thereto and a conduit extending downwardly from the lower portion of the upper zone to an intermediate point in the lower zone for returning to the latter catalyst from above the partition.

7. A reactor of the class described comprising in combination an elongated vertical, cylindrical shell closed at its upper and lower ends and provided with a partition intermediate said ends which divides the same into an upper contacting and reaction zone and a lower contacting and regeneration zone, means for admitting regenerating gases to the lower portion of said lower zone for contacting spent catalyst with oxygen containing gas to remove carbonaceous material deposited thereon, means for admitting gaseous hydrocarbon reactants to be converted to the lower portion of said upper zone for contacting with a powdered catalyst, means for admitting freshly divided solid contact material to said reactor to replace catalyst powder carried away in the effluent stream of hydrocarbon reaction products and the effluent stream of gaseous products of regeneration, means disposed within the upper portion of said upper zone for separating by centrifugal force entrained particles of said solid contact material from the reaction products withdrawn from the upper portion of the lower zone, means for separating by centrifugal force disposed within the upper portion of the upper zone for separating entrained particles of said solid contact material from regenerating gases withdrawn from the upper portion of the upper zone, outlet connections on said centrifugal separating means and on the shell for discharging reaction products and spent regenerating gases from the respective separating means and from the reactor, conduits extending from each of said separating means downward to an intermediate point in the upper zone for returning said separated particles thereto, and a conduit extending downwardly from the lower portion of the upper zone to an intermediate point in the lower zone for returning catalyst from above the partition.

CHARLES L. THOMAS.